(12) United States Patent  (10) Patent No.: US 8,724,312 B2
Jones et al.  (45) Date of Patent: May 13, 2014

(54) MOBILE COMPUTER STAND WITH INTEGRATED KEYBOARD

(76) Inventors: Bradley Jones, San Anselmo, CA (US); Paul Tomita, Mill Valley, CA (US)

( * ) Notice: Subject to any disclaimer, the term of this patent is extended or adjusted under 35 U.S.C. 154(b) by 188 days.

(21) Appl. No.: 13/069,146

(22) Filed: Mar. 22, 2011

(65) Prior Publication Data

US 2011/0170252 A1  Jul. 14, 2011

Related U.S. Application Data

(63) Continuation-in-part of application No. 12/490,115, filed on Jun. 23, 2009, now Pat. No. 7,911,784.

(60) Provisional application No. 61/132,853, filed on Jun. 23, 2008.

(51) Int. Cl.
*H05K 5/00* (2006.01)
*H05K 7/00* (2006.01)
*G06F 1/16* (2006.01)
*A47B 91/00* (2006.01)
*A47G 29/00* (2006.01)
*B65D 19/00* (2006.01)

(52) U.S. Cl.
USPC .............................. 361/679.44; 361/679.41

(58) Field of Classification Search
USPC ............. 361/679.09, 679.55, 679.41, 679.42, 361/679.43, 679.44, 679.45; 345/168; 248/175, 346.03
See application file for complete search history.

(56) References Cited

U.S. PATENT DOCUMENTS

| | | | | |
|---|---|---|---|---|
| 5,262,762 A * | 11/1993 | Westover et al. | ............ | 345/168 |
| 6,381,128 B1 * | 4/2002 | Kramer | ................... | 361/679.55 |
| 6,464,195 B1 * | 10/2002 | Hildebrandt | .................. | 248/460 |
| 6,496,365 B2 * | 12/2002 | Tsai | ........................... | 361/679.4 |
| 6,538,642 B2 * | 3/2003 | Tsai | .............................. | 345/168 |
| 6,690,353 B2 * | 2/2004 | Chang | ........................... | 345/156 |
| 6,700,775 B1 * | 3/2004 | Chuang et al. | ........... | 361/679.01 |
| 6,714,404 B1 * | 3/2004 | Wu | ......................... | 361/679.09 |
| 6,724,614 B1 * | 4/2004 | Chiang et al. | ............ | 361/679.44 |
| 6,785,126 B2 * | 8/2004 | Hazzard et al. | .......... | 361/679.09 |
| 6,882,524 B2 * | 4/2005 | Ulla et al. | ................ | 361/679.09 |
| 6,940,713 B2 * | 9/2005 | Huang et al. | ............. | 361/679.09 |
| 6,952,340 B2 * | 10/2005 | Son et al. | ................. | 361/679.09 |
| 6,986,492 B2 * | 1/2006 | Huang et al. | ............ | 248/346.03 |
| 6,999,008 B2 * | 2/2006 | Wang et al. | ..................... | 341/22 |
| 7,103,698 B2 * | 9/2006 | Zhang et al. | ................... | 710/303 |
| 7,327,560 B1 * | 2/2008 | Tabasso et al. | .......... | 361/679.09 |
| 7,328,560 B2 * | 2/2008 | Martelli | .......................... | 53/564 |
| 7,561,414 B2 * | 7/2009 | Li et al. | ..................... | 361/679.26 |
| 2002/0171020 A1 * | 11/2002 | Huang et al. | ............. | 248/346.01 |
| 2003/0025674 A1 * | 2/2003 | Watanabe | ...................... | 345/168 |

* cited by examiner

*Primary Examiner* — Anthony Haughton
(74) *Attorney, Agent, or Firm* — Tomita IP

(57) ABSTRACT

A device for use with a portable computer includes a base, a stand having an upper portion and an adjustable linkage, and a connection mechanism. The base is adapted to rest upon a surface and includes a keyboard that is physically integrated with the base. The stand is attached to the base. The upper portion is adapted to provide a surface upon which a portable computer rests. The upper portion includes an attachment mechanism adapted to attach to a portable computer resting upon the upper portion to secure the portable computer physically to the upper portion. The adjustable linkage is connected to the base and is connected to the upper portion of the stand on another end. The adjustable linkage is adapted to position the upper portion of the stand. The connection mechanism provides data communication from the integrated keyboard to a portable computer resting upon the upper portion.

20 Claims, 17 Drawing Sheets

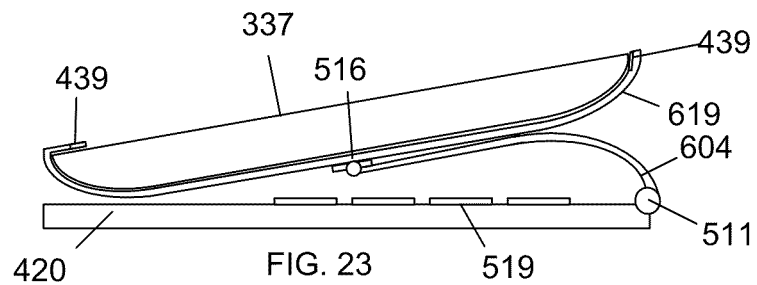
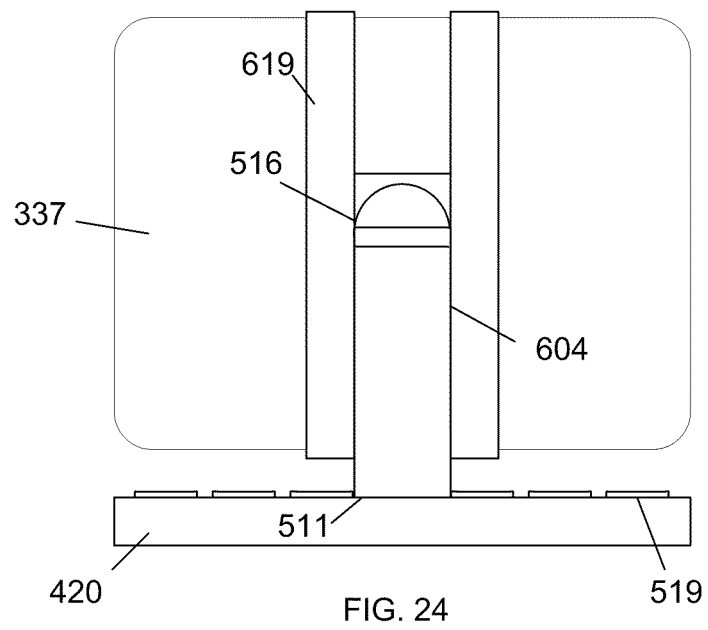

MOBILE COMPUTER STAND WITH INTEGRATED KEYBOARD

CROSS-REFERENCE TO RELATED APPLICATIONS

This application is a continuation in part of U.S. patent application Ser. No. 12/490,115, filed Jun. 23, 2009, now U.S. Pat. No. 7,911,784 which claims priority from U.S. Provisional Patent Application Ser. No. 61/132,853, filed on Jun. 23, 2008, and entitled "Mobile Computer Stand and Related Methods." The contents of U.S. Pat. No. 7,911,784 and U.S. Provisional Patent Application Ser. No. 61/132,853 are hereby incorporated in their entirety by reference.

TECHNICAL FIELD

This disclosure relates to computers and computer accessories.

BACKGROUND

Portable electronic devices, such as laptop computers, tablet computers, portable digital video disc (DVD) players, etc. may be used almost anywhere, such as at home, on a bus, on an airplane, etc. When a portable device is used in some locations, such as in place that is restricted by space or proximity to other items (e.g., on an airplane), the keyboard and screen may be presented at an awkward position or angle relative to the user. For example, a laptop sitting on the user's lap may require the user to look downward to see the laptop's screen. Also for example, using a laptop computer in a constrained environment such as on an airplane, with the laptop computer on the tray-top table, may pose difficulties. This is especially the case when a traveler sitting in the seat in front of the laptop computer reclines the seat, which constrains the workspace even further. In this case, it may not be possible to open entirely the laptop computer, and thus the screen may be partially faced downward. To rectify this situation, the laptop must be pulled toward the user, thus requiring their arms to be pushed backward into their seat. The position of the arms and head may lead to user discomfort and aggravation over time.

SUMMARY OF THE INVENTION

In a first aspect, a device for use with a portable computer includes a base, a stand having an upper portion and an adjustable linkage, and a connection mechanism. The base is adapted to rest upon a surface and includes a keyboard that is physically integrated with the base. The stand is attached to the base. The upper portion is adapted to provide a surface upon which a portable computer rests. The upper portion comprises an attachment mechanism adapted to attach to a portable computer resting upon the upper portion of the stand to secure the portable computer physically to the upper portion of the stand. The adjustable linkage is connected to the base on one end and is connected to the upper portion of the stand on another end. The adjustable linkage is adapted to position the upper portion of the stand such that the surface of the upper portion upon which a portable computer rests is positioned in space at least in part directly above the integrated keyboard of the base and of sufficient distance above the integrated keyboard of the base to allow a user to position the user's hands on the integrated keyboard to cause input to be made on the integrated keyboard. The connection mechanism is associated with the integrated keyboard and is adapted to provide data communication from the integrated keyboard to a portable computer resting upon the upper portion of the stand.

Implementations may include any, all or none of the following features. The base may include an attachment mechanism adapted to attach to a structure comprising the surface upon which the base rests. The attachment mechanism may be adapted to attach to a tray table for a seat on a transport vehicle. The adjustable linkage may be adapted to collapse when not in use in a manner such that the upper portion is directly adjacent the base. The adjustable linkage may be adapted to position the upper portion such that a forward end of the upper portion of the stand is forward of a plane extending vertically from a forward end of the integrated keyboard. The connection mechanism may include a wired connection that extends from the integrated keyboard and internally through the adjustable linkage to an output connector that is connectable to a portable computer resting on the upper portion of the stand. The connection mechanism may be further adapted to provide a power connection from a portable computer resting upon the upper portion of the stand to the integrated keyboard. The connection mechanism can include a wireless transceiver electrically connected to the integrated keyboard and adapted to communicate with a portable computer resting on the upper surface of the stand to provide data communication from the integrated keyboard to the portable computer. The device may further include a battery power source to provide a power source for the integrated keyboard and/or the attached portable computer. The battery power source may be located in the base of the device. The device may be adapted to be used with a clam-shell type portable computer comprising a keyboard on a first part of the portable computer and a visual display on a second part of the portable computer, wherein when closed the keyboard of the portable computer faces the visual display of the portable computer. The upper portion of the device may include one or more inserts of different configurations, each insert configured for attaching to the underside of one or more different models of clam-shell type portable computers. The base further may further include at least one of a DVD drive, a Blueray drive, a USB port, a media card reader, and a connector for a mouse-type pointing device.

In a second aspect, a stand device for use with a portable computer includes a base, a stand attached to the base and having an upper portion and an adjustable linkage, and a connection mechanism. The base is adapted to rest upon a surface and comprises a keyboard that is physically integrated with the base. The base comprises an attachment mechanism adapted to attach to a structure comprising the surface upon which the base rests. The upper portion is adapted to provide a surface upon which a portable computer rests and as attachment mechanism associated with the upper portion and is adapted to attach to a portable computer resting upon the upper portion of the stand to secure the portable computer physically to the upper portion of the stand. The adjustable linkage is connected to the base on one end and is connected to the upper portion of the stand on another end. The adjustable linkage is adapted to position the upper portion of the stand such that the surface of the upper portion upon which a portable computer rests is positioned in space at least in part directly above the integrated keyboard of the base and of sufficient distance above the integrated keyboard of the base to allow a user to position the user's hands on the integrated keyboard to cause input to be made on the integrated keyboard.

The connection mechanism is associated with the integrated keyboard and is adapted to provide data communication from the integrated keyboard to a portable computer resting upon the upper portion of the stand.

Implementations may include any, all or none of the following features. The adjustable linkage may be adapted to position the upper portion such that a forward end of the upper portion of the stand is forward of a plane extending vertically from a forward end of the integrated keyboard.

The details of one or more implementations are set forth in the accompanying drawings and the description below. Other features and advantages will be apparent from the description and drawings, as well as from the claims.

BRIEF DESCRIPTION OF DRAWINGS

FIGS. 20-26 illustrate an embodiment of the stand in multiple positions.

DETAILED DESCRIPTION

This disclosure discusses a mobile computer stand with an integrated keyboard. The mobile computer stand may be used, for example, to support a portable computer such as a tablet computer or a laptop computer or another electronic device, such as a digital media player, portable DVD player, etc. The stand may further raise and position the laptop in various ways to make the laptop easier to use, for example, in a constrained working environment, such as in the cramped seats of an airplane, train, bus, car, etc.

Figure 1A:
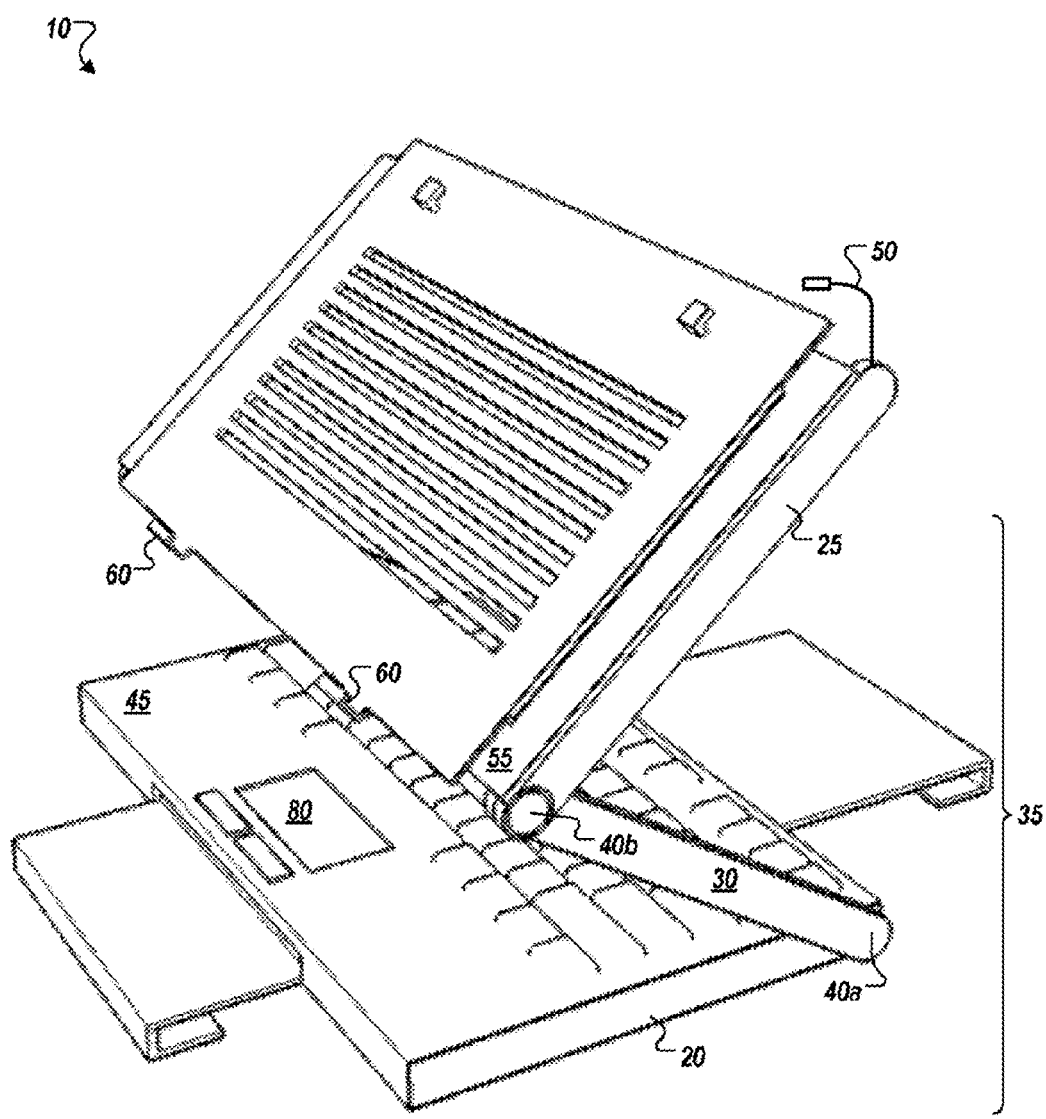
FIGS. 1A and 1B are perspective views of an exemplary portable computer stand device, with FIG. 1B showing a portable computer positioned on the laptop computer stand.
Figure 1B:
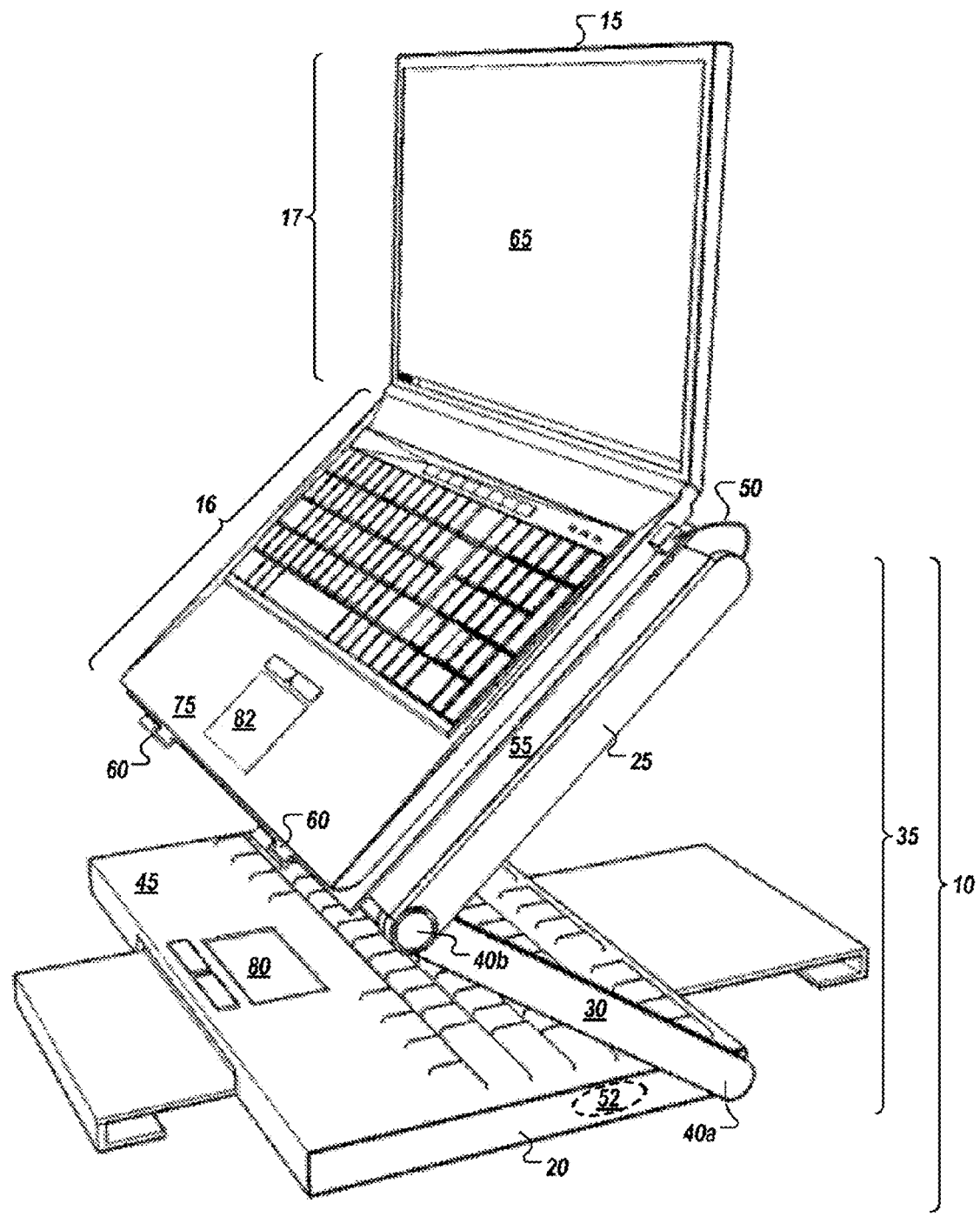

FIGS. 1A and 1B are perspective views of an exemplary laptop computer stand device (or "device") 10, operable to support a laptop computer (or "laptop") 15 or any other electronic device. FIG. 1A shows the stand 10 without the laptop 15. FIG. 1B shows the laptop 15 resting on top of stand 10. The term "laptop," when used herein, may also refer to any portable electronic device, such as a tablet computer, a portable DVD player, etc. The device 10 includes a base 20 and an upper portion 25 connected to the base 20 by one or more adjustable linkages 30. As depicted, the upper portion 25 and the two adjustable linkages 30 serve as a stand 35 for the laptop 15. The stand 35 may be adjusted by the user in order to position the laptop 15 at an ideal height and angle, such as at eye level when the user is using the laptop 15 on an airplane. FIGS. 1A and 1B, as well as other figures described herein, may not be to scale, and any suitable dimensions for the device 10 may be used.

The device 10 may be used with any hinged clam-shell type portable computer 15, such as a laptop computer (or "laptop") 15 as shown in FIG. 1B, comprising a keyboard 75 on a first part 16 of the portable computer and a visual display 65 on a second part 17 of the portable computer. The first and second parts 16 and 17 are attached by a hinge, which allows the two parts 16 and 17 to be opened and closed relative to one another. When portable computers or laptops 15 of this type are closed, the keyboard 75 typically faces the visual display (or screen) 65 of the device. The device 10 may also be used with other electronic devices that are not hinged, such as tablet computers or other computers.

Two adjustable linkages 30 may be used, for example, each one attaching a side (the left or right side) of the base 20 to the corresponding side of the stand's upper portion 25. Each adjustable linkage 30 may attach, at a first end, to the base 20 at a first pivot point 40a and, at a second, opposite end, to the stand's upper portion 25 at a second pivot point 40b. The pivot points 40a and 40b may have, for example, a push button or other mechanism or control for locking and unlocking the adjustable linkages 30 in a particular position, such a mechanism being any number of such mechanisms that may be known to one of skill in the art. If a push button type mechanism is used, for example, the push button may include an internal spring mechanism that, when pressed, releases the pivot point from a locked position so that it can be moved or adjusted to another position. For example, while either or both of the push buttons are pressed, the pivot points 40a and 40b may pivot more freely, allowing adjustment of the stand 35 to an ideal height and position. In some implementations, the pivot points 40a and 40b may include pre-set positions (e.g., using grooves, etc.). In some implementations, the pivot points 40a and 40b may use some sort of ratcheting joint, pressure joint, interlocking cutout joints, etc. In some implementations, the pivot points 40a and 40b may be "continuously adjustable" (e.g., using a pressure joint) or use distinct adjustment points (e.g., a ratchet joint).

The adjustable linkages 30 may be adapted also to allow the device 10 to fully collapse into a compact state when not in use, such as when the user intends to use the laptop 15 directly on his lap without extending the stand 35 upward. In this position, the base of the laptop 15 may be parallel to and nearly adjacent to the base 20, separated only by the upper portion 25. In addition, in this position, the device 10 may be carried easily along with the laptop computer 15 in a laptop computer carrying bag.

Figure 3:
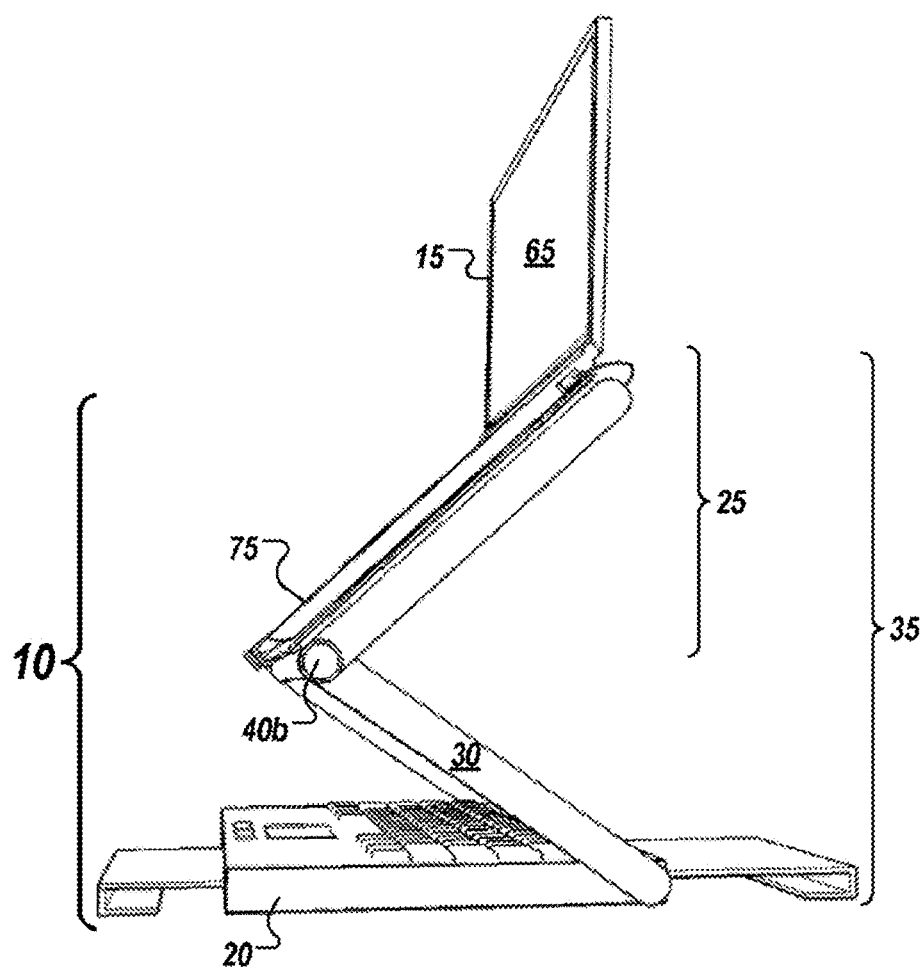
FIG. 3 shows a side view of the device shown in FIGS. 1A, 1B and 2.

In some implementations, the adjustable linkages 30 may be extendable in length, making it possible to position the upper portion 25 such that a forward end of the laptop 15 is forward of a plane extending vertically from a forward end of the integrated keyboard, as may be seen in FIG. 3. As a result, the front edge of the laptop 15 may be closer to the user than the front edge of the base 20. As such, the display screen of the laptop computer 15 would also be closer to the user, thus putting it out of the way of a reclining seat, in the event the laptop computer 15 is being used in a constrained environment of a seat on an airplane. In other implementations, the upper portion 25 of the stand 20 need not extend forward of a plane extending vertically from a forward end of the integrated keyboard of the base 20 (when the base 20 is resting on a horizontal surface). In such a case, it may be sufficient that the stand 35 is adapted so that its upper portion 25 may be positioned in space at least in part directly above the integrated keyboard 45 of the base 20. In this case also, the laptop display screen would be out of the way of a seat being reclined in front of the user on an airplane. In either event, the stand 35 should also be adapted to be adjusted so that the upper portion 25 of the stand 35 may be positioned a sufficient distance above the integrated keyboard of the base 20 to allow a user to position the user's hands on the integrated keyboard 45 to cause input to be made on the integrated keyboard 45. In some implementations, the linkages 30 may include pre-determined locking slots or grooves which the user may engage to lock the linkages 30 in a desired position. In some implementations, the length of the adjustable linkages 30 may be eight to 16 inches (e.g., about 10 inches) and may depend on the dimensions of the base 20.

The base 20 may rest upon any relatively flat surface, such as a user's lap, a table top, an airplane fold-down tray table, or any other place that a laptop may be used. The base 20 includes an integrated keyboard 45 that is physically integrated with the base 20. A connection system 50 associated with the integrated keyboard 45 provides data communication from the integrated keyboard 45 to the laptop 15 (or other electronic device) resting upon the upper portion 25 of the stand 35. The connection system 50 may be wired or wireless. For example, the connection system 50 may be a cable that communicatively couples the integrated keyboard 45 to the laptop 15, such as using a port in the laptop 15.

In some implementations, the keyboard 45 may be configured to slide forward (e.g., toward the user) or backward, such as on a rail or other structure, allowing the user to position the keyboard 45 at a user-selected distance relative to the base 20. For example, a user with shorter arms may position pull the keyboard 45 closer.

When the connection system 50 uses a wired connection, one or more wires may extend from the integrated keyboard 45 and internally through the adjustable linkages 30 to a connector on the upper portion 25. The connector then may be connected to an input port on the laptop 15. In some implementations, the wired connection may use a cable that may extract from (and retract into) the base 20.

In some implementations, the wires passing through the adjustable linkages 30 may include power connections. For example, the power connections may provide power to the integrated keyboard 45 using, for example, battery or other power from the laptop 15. In another implementation, the device 10 may have its own power source, and not need the power source of the portable computer 15.

When the connection system 50 uses wireless communication, the integrated keyboard 45 may include a wireless transceiver 52 that can be embedded within the base 20, that is adapted to communicate with the laptop 15. The communication may include data communication from the integrated keyboard 45 to the laptop 15. In some implementations, the device 10 may include a battery power source to provide a power source for the integrated keyboard. The battery or batteries of the battery source may be rechargeable using a power cord connectable to the device 10. In some implementations, the battery power source may be located in the base of the device 10. For example, the battery source may be located beneath a cover (not shown in FIG. 1A or 1B) at the back edge of the underside of the base 20 and operable to be recharged by a retractable or other power cable.

The upper portion 25 of the stand 10 provides a surface 55 upon which the laptop 15 (or other portable computer or device) may rest. The upper portion 25 further includes a laptop attachment mechanism for securely attaching the laptop 15 to the stand 35. The laptop attachment mechanism may include, for example, two or more clips 60 at the front of the upper portion 25. The attachment mechanism may also include, for example, clips or screws that connect the sides (e.g., near the back) or bottom of the laptop 15 to the upper portion 25. A more detailed description of laptop attachment mechanisms is provided below with respect to FIG. 2.

The stand 35 may allow the laptop to be positioned at various heights above (and at various angles relative to) the base 20. For example, as depicted, the adjustable linkages 30 are extended relative to the base 20 and upper portion 25 to raise the laptop 15 several inches (e.g., two to ten inches, such as at about three to five inches or any height suitable for fitting the user's hands on the integrated keyboard 45) above the base 20 at the angle depicted. In this position, for example, the user of the laptop 15 may benefit from positioning a laptop screen 65 at eye level or some other suitable angle relative to the user's line-of-sight. Angles and heights may also depend upon how the hinges (e.g., pivot point 40b) are angled, as well as the dimensions of the device. In some implementations the base 20 may be from about 8 to 20 inches wide (e.g., 12 inches), from about six to 16 inches deep (e.g., 10 inches), and from about ⅜ inch to 2 inches thick (e.g., one-half inch). Data may be entered on a laptop keyboard 75 of the laptop 15. Moreover, because of the data communication from the integrated keyboard 45 to the laptop 15 (e.g., using the connection system 50), the user may use either the integrated keyboard 45 or the laptop keyboard 75 in order to interact with the laptop 15.

Other redundant or parallel controls may exist, such as a mouse pad and buttons 80 on the integrated keyboard 45 and a mouse pad and buttons 82 on the keyboard 75. In this way, the user may use either of the keyboards 45 or 75, or some combination thereof (e.g., generally using the keys of one keyboard, and the mouse pad of the other keyboard). In some implementations, the integrated keyboard 45 may include other ports (e.g., USB ports, headphone ports, etc.).

The stand 35 may be manufactured from various lightweight materials, such as any combination of plastics, lightweight metals, fiberglass, etc. The design of the stand 35 may include features, for example, that make the laptop 15 significantly less likely to sustain damage from static electricity.

Figure 2:
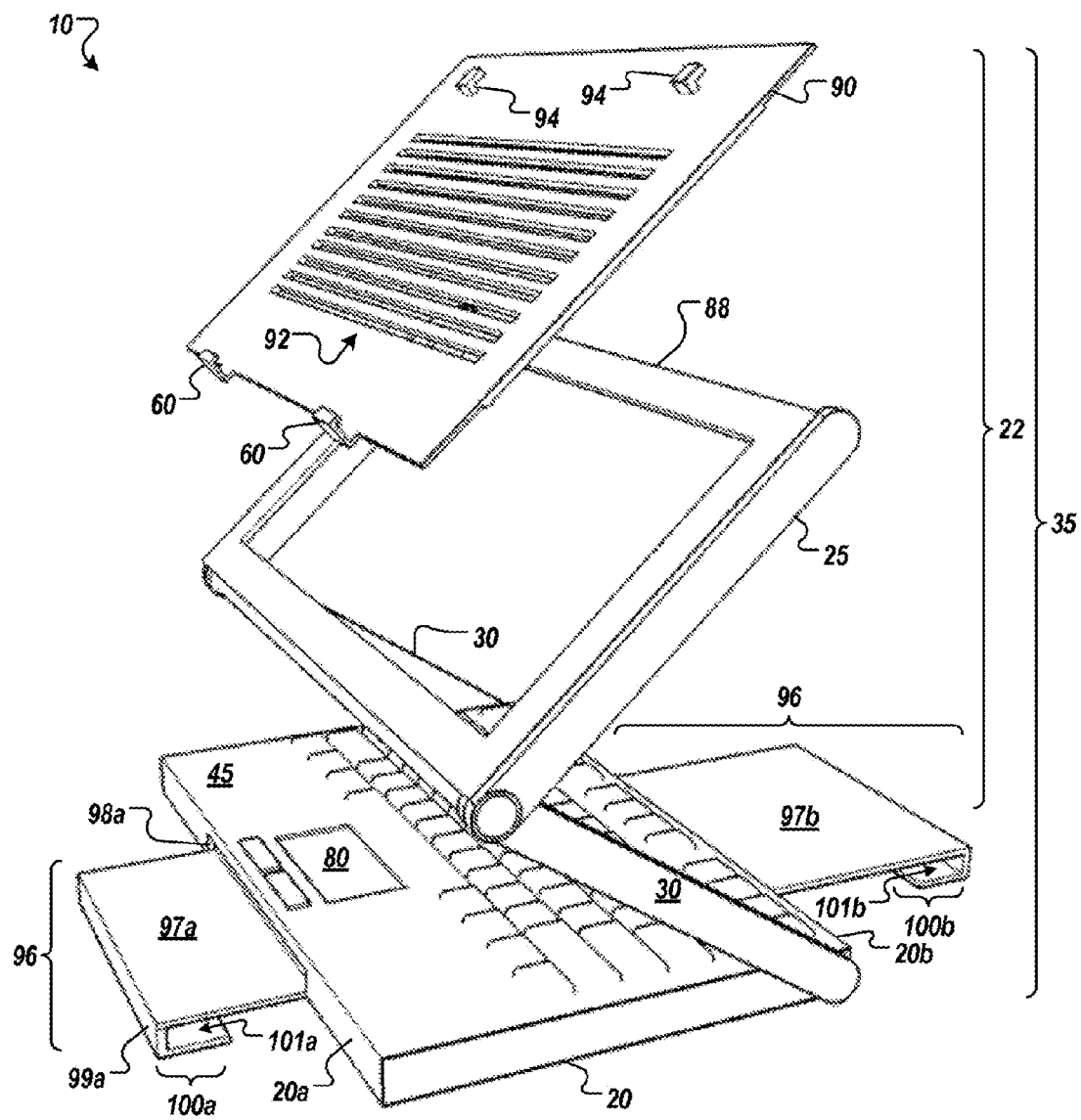
FIG. 2 shows a perspective exploded view of the device shown in FIGS. 1A and 1B.

FIG. 2 shows a perspective exploded view of the device 10 with the components separated by vertical space. For example, the laptop 15 is depicted above the stand 35. In some implementations, the upper portion 20 of the stand 35 may include a frame 88 and a removable insert 90 that may be connected to, and removed from, the frame 88. Different inserts 90 may exist for different laptop models (e.g., XYZ Computer Maker's model X1437). For example, depending on the laptop model, the insert 90 may include a different arrangement of ventilation slots 92, positioned to line up with any sections or areas of the underside of the laptop 15 requiring ventilation to mitigate heat or to properly vent cooling fans, etc. Inserts 90 may also include clips (e.g., snap-on clips) or screws 94 operable to attach to the bottom surface of the laptop 15. For example, each laptop model may have a different arrangement of securing screws or clips, and the clips or screws 94 may be attached to the underside of the laptop 15.

In some implementations, the insert 90 and the frame 88 may be combined into a single component. In this case, the combination of the insert 90 and the frame 88 may attached directly to the upper portion 25, such as using snaps, clips, screws, etc.

In some implementations, the base 20 includes one or more attachment mechanisms 96 for attaching or securing the device 10 to any structure upon which it rests. For example, for situations when the user is a passenger on an airplane (or other transport vehicle), attachment mechanisms 96 on the base 20 may be deployed to securely fasten the base 20 to the passenger's pull-down tray table. For example in the implementation shown in FIG. 2, the mechanisms 96 include a first rectangular plate 97a that is positioned within a first slot 98a that extends inward into the base 20 from a front side 20a of the base 20, and a second rectangular plate 97b that is positioned within a second slot (not shown in FIG. 2, but similar to the first slot 98a) that extends inward into the base 20 from a back side 20b of the base 20. Each of the rectangular plates 97a and 97b may be pulled out of their corresponding slots, and by force of spring (not shown in FIG. 2) will be urged back into the corresponding slots (e.g., slot 98a). At a distal edge 99a of each of the rectangular plates 97a and 97b is a hook-type edge 100a that hooks downward and back, and forms a slot 101a. A slot 101b is similarly formed on hook edges 100b on the second rectangular plate 97b. The purpose of the hook edges 100a and 100b and the slots 101a and 101b they form is to engage the front edge and the back edge of a tray table, for example, to secure the base 20 firmly to the tray table. As a result, the laptop 15 and the device 10 to which it is attached may be held in place at any elevation change (e.g., any slope of the airplane) and despite any sudden elevation changes or turbulence.

In another implementation, the mechanism to attach the base 20 of the device 10 to a tray table includes one or more straps that may be looped underneath the tray table and attached to the base 20. For example, a set of straps may be two inches wide, with one strap passing through an end-loop of another strap, then folding back onto itself and securing with Velcro or other fastener. In some implementations, the straps used to secure the device 10 may also serve as a carrying handle for the entire device 10. In some implementations, the strap(s) may also be used to secure and carry the laptop 15, such as while it is attached to the device 10. In some implementations, the straps may be part of an integrated cover or carrying bag for the device 10 and laptop 15.

In some implementations, the device 10 may include one or more cooling fans, such as contained in the base 20. Cooling fans may help to cool the laptop 15, for example, when the upper portion 25 is fully collapsed onto the base 20. In some implementations, power from the laptop's battery may be used to power cooling fans in the device 10

FIG. 3 shows a side view of the device 10 supporting the laptop 15. This view shows the stand 35 extended in a position such that the upper portion 25 is raised several inches (e.g., at least three to five inches) above the base 20. As shown, the laptop screen 65 is also positioned relatively vertical in relation to the base 20. Using the pivot point 40b, the upper portion 25 is positioned such that the keyboard 75 is positioned at a significant angle (e.g., approaching 45 degrees) relative to the base 20. In this position, the laptop screen 65 may be at a height relatively close to eye-level of the user.

Figure 4:
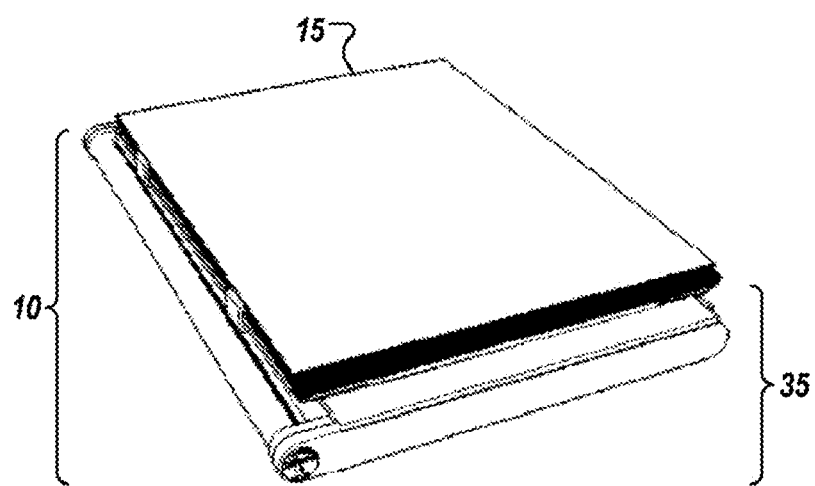
FIG. 4 shows a perspective view of the device of FIGS. 1A, 1B, 2 and 3 in a fully-collapsed position.

FIG. 4 shows a perspective view of the device 10 in the fully-collapsed position with the laptop 15 closed and attached to the device 10. In this position, the device 10 may automatically perform certain functions. For example, in some implementations, the device 10 may automatically go into "sleep" or "standby" mode or power off entirely. In some implementations, if the device 10 is in standby mode, temperature sensors in the base 20 may be operable to detect temperatures above a certain threshold. When that temperature is reached, for example, the device 10 may automatically start cooling fans.

Figure 5:
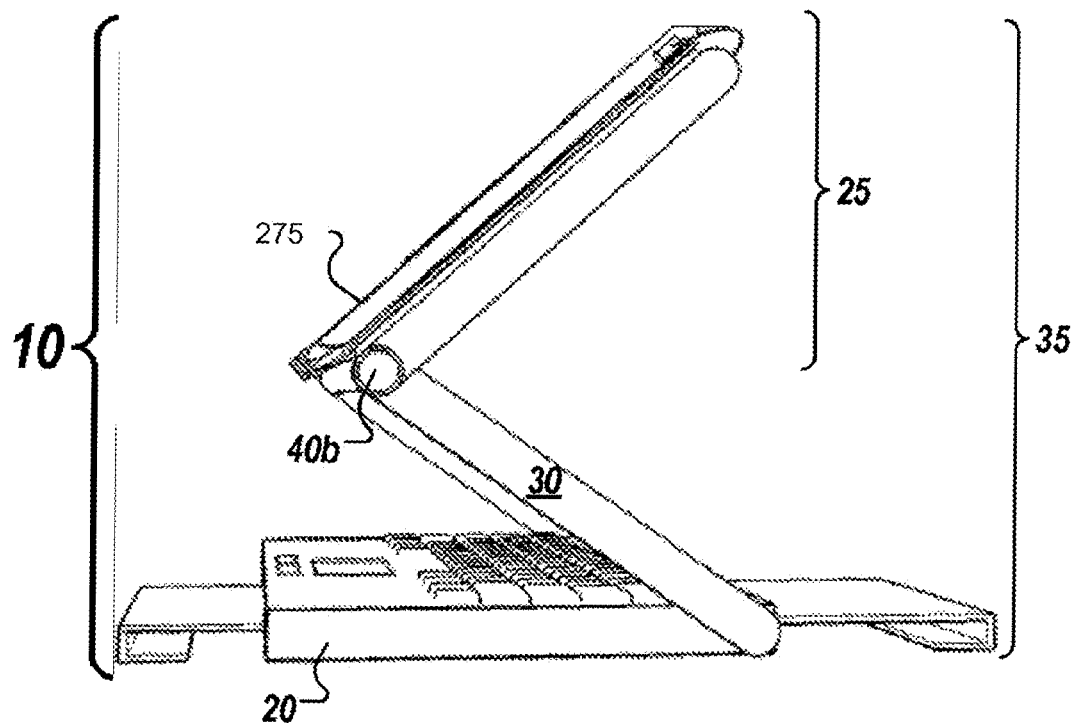
FIG. 5 shows a side view of the device shown in FIGS. 1A, 1B and 2 used with a tablet computer.

FIG. 5 shows a side view of the device 10 supporting the tablet computer 15. This view shows the stand 35 extended in a position such that the upper portion 25 is raised several inches (e.g., at least three to five inches) above the base 20. As shown, the tablet screen 275 is also positioned at an angle in relation to the base 20. Using the pivot point 40b, the upper portion 25 is positioned such that the laptop screen 275 may be easily viewed by the user.

Figure 6:
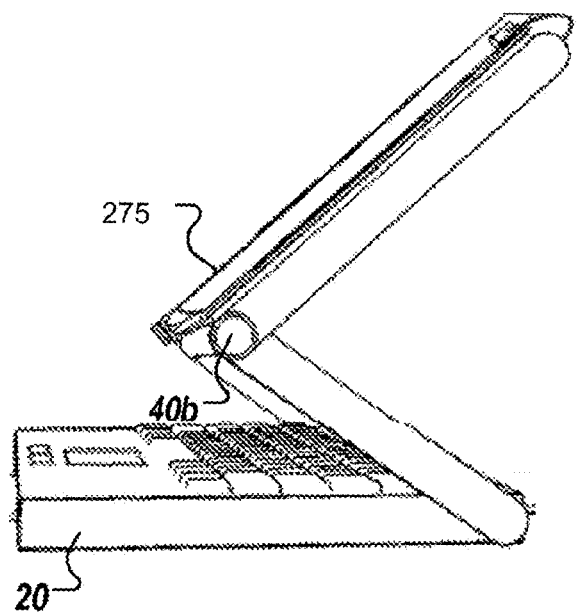
FIG. 6 shows a side view of the device shown in FIGS. 1A, 1B and 2 used with a tablet computer and shorter linkages.

FIG. 6 shows a side view of the device 10 supporting the tablet computer 15. This view shows the stand 35 extended in a position such that the upper portion 25 is above the base 20. The adjustable linkages 30 may be shorter so that the tablet 275 only overlaps a portion of the keyboard. Again, the display of the tablet 275 can also positioned at an angle in relation to the base 20 such that the laptop screen 275 may be easily viewed by the user.

Figure 7A:
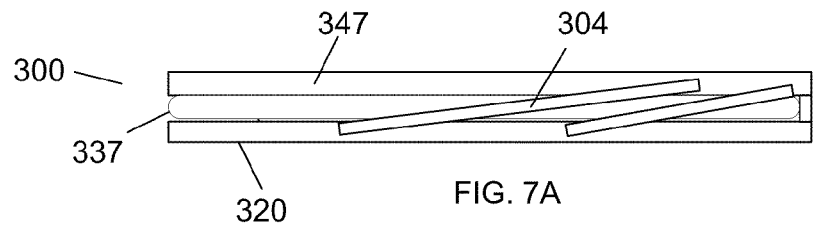
FIGS. 7A-7D show a side view of the device used with four rotating linkages.
Figure 7B:
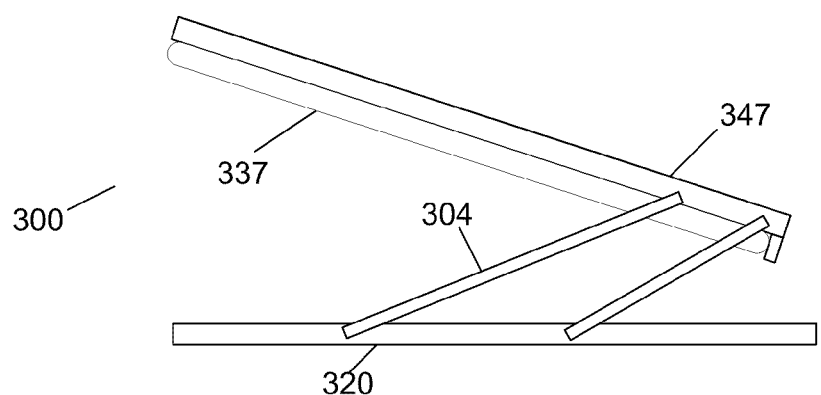
Figure 7C:
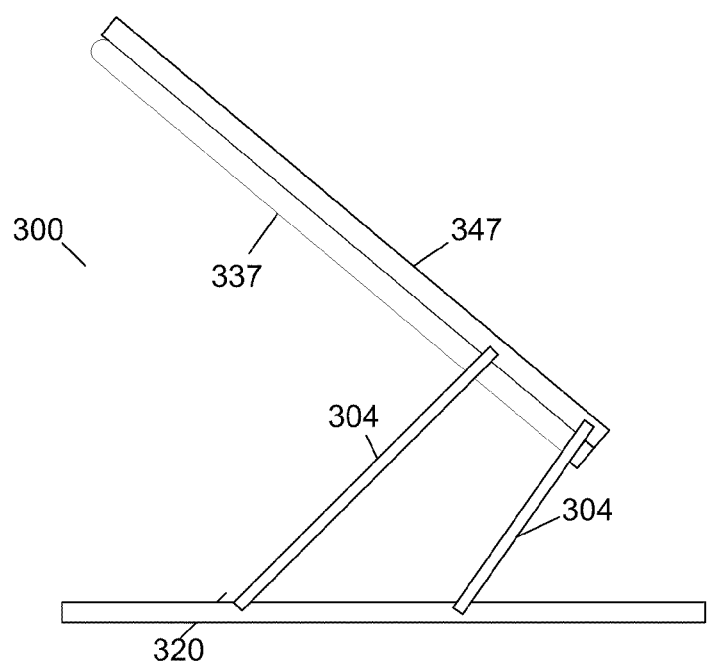
Figure 7D:
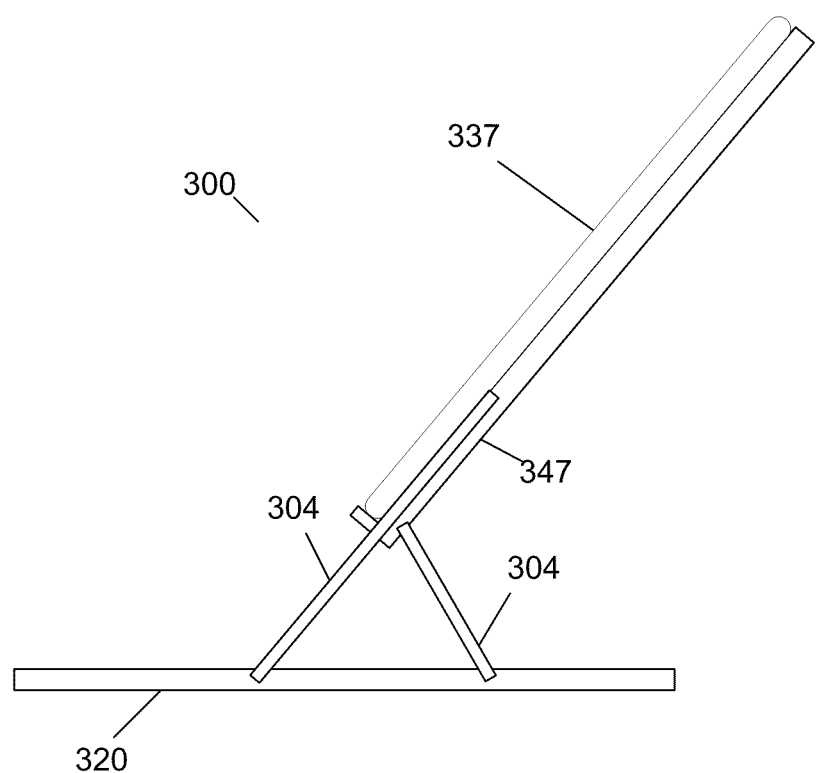

Although the device has been described as having a base coupled to a stand by two linkage mechanisms, in other embodiments, the base can be coupled to the stand by one or more linkage mechanisms. For example, with reference to FIGS. 7A-7E, a series of drawings of the device 300 are illustrated that show a possible embodiment of a base 320 having an integrated keyboard coupled to a stand 335 coupled to a frame 347 that holds a tablet computer 337 by four linkages 304. FIG. 7A illustrates the device 300 in the closed position with the stand 335 and the base 320 parallel to each other. The screen of the tablet computer 337 may face the keyboard integrated into the base 320. With reference to FIG. 7B, when the frame 347 is moved up and away from the base 320, the linkages 304 rotate and pull the tablet computer 337 away from the base 320. With reference to FIG. 7C, the tablet computer 337 may continue to rotate through a near vertical position and with reference to FIG. 7D, the stand 335 may stop with the tablet computer 337 facing the user in a stable position over the base 320.

Figure 8:
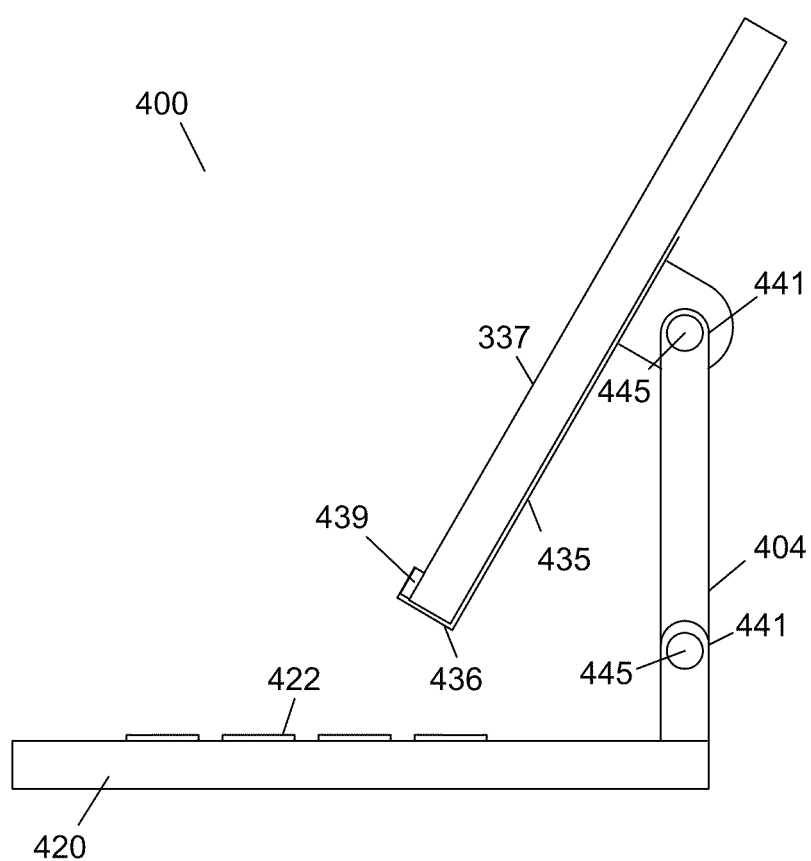
FIG. 8 shows a side view of the device used with a single rotating linkage.
Figure 9:
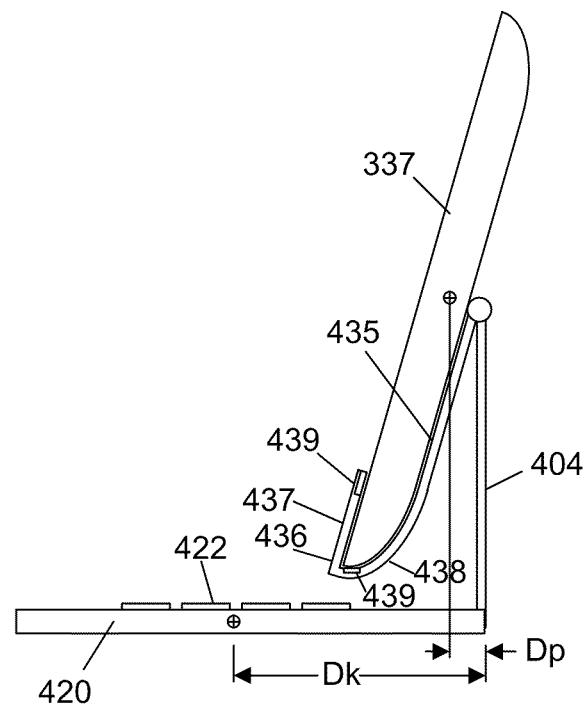
FIG. 9 illustrates a side view of an embodiment of the stand.

As shown in FIGS. 8 and 9, it is also possible to have a device 400 having a base 420 having an integrated keyboard 422. The base 420 is also connected to a stand having a single adjustable linkage 404 connecting an upper portion 435 adapted to attach to the portable computer 337. The adjustable linkage 404 can be adjusted by the user so that the tablet computer 337 faces the user. The linkage 404 may have one or more joints 441 that can be located at the ends of the linkage 404. The one or more of the joints 441 may have locking mechanisms 445 that prevent the joints 441 from rotating and the linkage 404 from moving after the joints 441 have been locked in place.

The upper portion 435 of the stand may have a groove structure 436 which corresponds to the shape of an edge of the tablet computer 337 and helps to support the tablet computer 337 on the stand 435. The groove structure 436 can be a tray that extends along an edge of the stand 435 or a plurality of clips (Ref. No. 60 as shown in FIGS. 1A, 1B and 2) coupled to the stand 435. In an embodiment, the tablet computer 337 may have integrated magnets 439 which are used for attaching the tablet computer 337 to accessory devices. The stand 435 may have a corresponding permanent magnet 439 which can be attached to the magnets of the tablet computer 337. This magnetic attraction between the permanent magnet(s) 439 in the stand and the magnets in the tablet computer 337 can help to secure the tablet computer 337 to the groove structure 436 and the stand 435. In order to remove the tablet computer 337 from the stand 435, the user can slide the tablet computer 337 up and out of the groove structure 337 with a force that is greater than the magnetic attraction of the permanent magnet(s) 439. This connection may be used in addition to or as a replacement for other connection mechanisms which can hold the tablet computer 337 to the stand 435.

With reference to FIG. 9, an embodiment of the stand 320 with an upper portion 435 having a groove structure 436 that has a substantially planar front interior surface 436 and a concave rear interior surface 438. The groove structure 436 may also include one or more magnets 439. The magnet(s) 439 may be placed in the planar portion or a bottom edge of the groove of the groove structure 436. The positions of the magnet(s) 439 may correspond to the locations of magnets that are incorporated into the mobile computer 337.

In order to keep the stand stable, it can be important to have the center of gravity of the device components between the front and rear edge of the base 420. In this example, the center of gravity of the tablet computer 337 is forward of the rear edge of the base by the distance Dp and the center of gravity of the base is forward to the rear edge of the base by the distance Dk. Because both distances are forward of the rear edge, the stand will be stable. If the center of gravity of the tablet computer 337 is behind the rear edge of the base 420, the mass of the base×Dk must be greater than the mass of the mobile computer×Dp in order for the stand to be stable.

Figure 10:
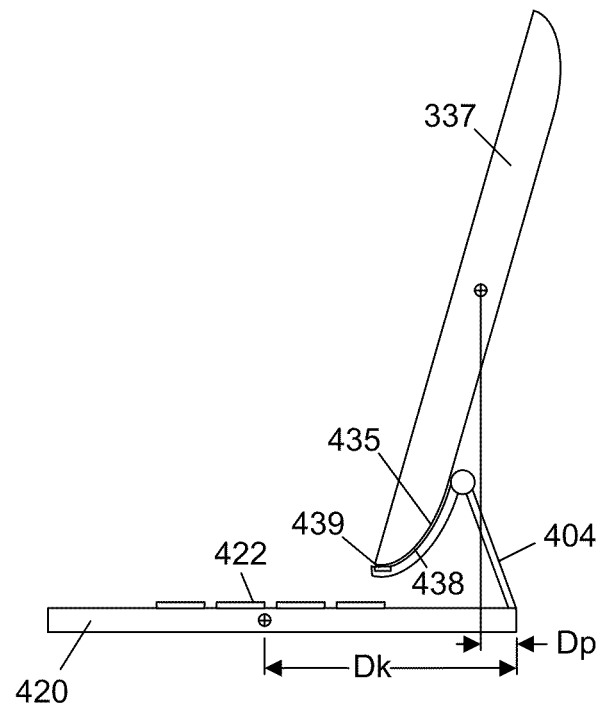
FIG. 10 illustrates a side view of another embodiment of the stand.

It is also possible to connect the base 420 of the stand to a support structure such as a table by using a securing mechanism. In an embodiment, the mechanism shown in FIG. 2 can be used to secure the base to the support structure. In other embodiments, other securing mechanisms such as a clamp, suction cups, temporary adhesive or other attachment mechanisms can be used to secure the base 420. In these embodiments, it may be possible to have the mass of the base×Dk be less than the mass of the mobile computer×Dp while maintaining the stand in a stable state. With reference to FIG. 10, in an embodiment, the upper portion 435 of the stand can only include a concave section 438 and may omit the groove structure. The tablet computer 337 can be held to the upper portion 435 by the magnetic force of the magnet 439 with the magnets of the tablet computer 337. The linkage 404 may also be shorter. However, again for stability, the center of gravity of the tablet computer 337 is preferably forward of the rear edge of the base 420. In order to keep the center of gravity forward of the rear edge of the base 420, the linkage 404 may be angled forward. Alternatively, if the center of gravity is behind the rear edge of the base 420, the mass of the base x Dk must be greater than the mass of the mobile computer×Dp if the center of gravity is behind the rear edge of the base 420.

Figure 11:
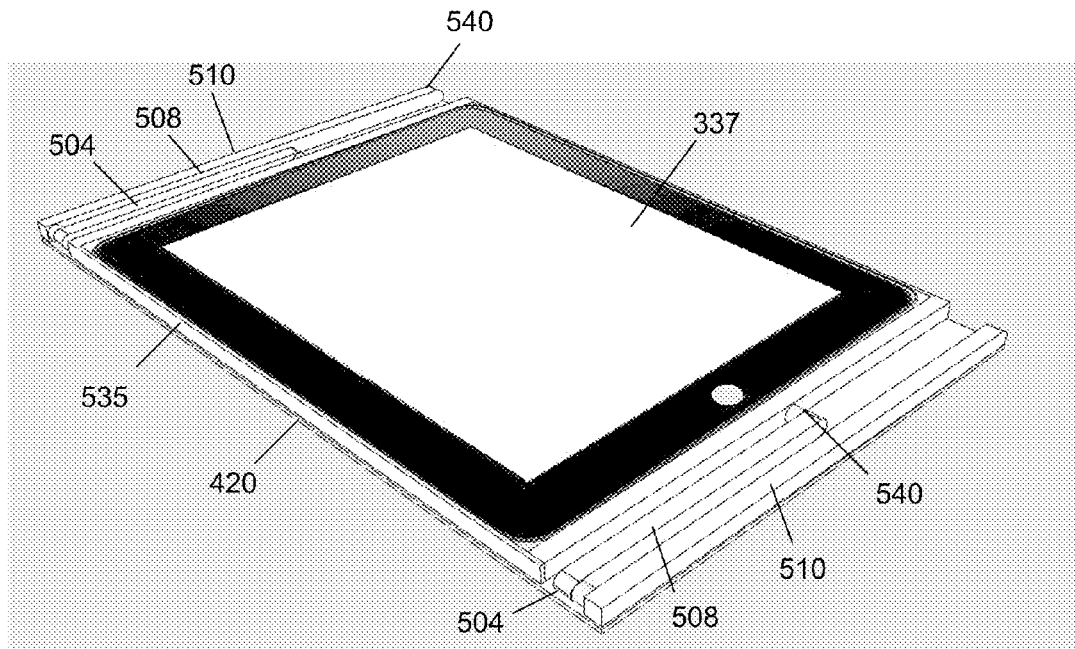
FIGS. 11-14 illustrate an embodiment of the stand in multiple positions.
Figure 12:
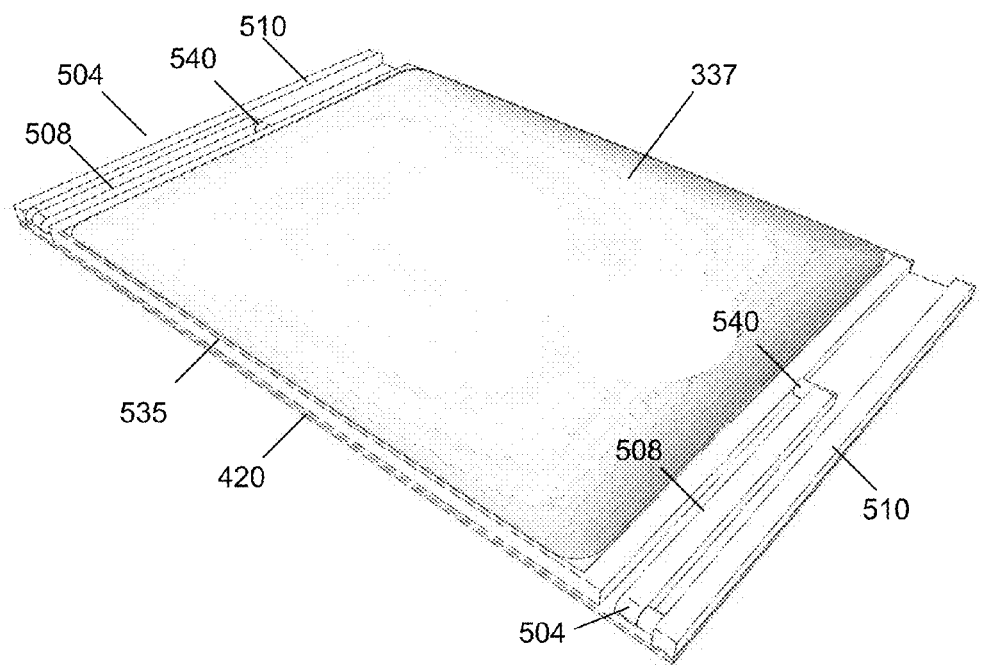

With reference to FIG. 11, in an embodiment the stand may be used with the tablet computer 337 in a first configuration with the display exposed and facing away from the base so that the tablet computer 337 can be used or with reference to FIG. 12, in a second configuration with the back of the tablet computer 337 exposed and the display facing the base 420. In this embodiment, the stand may include an upper portion 535 of the stand which at least partially surrounds the perimeter of the tablet computer 337. The upper portion 535 may be coupled to a linkage 504 by rotational couplings 540 mounted along the center line of the tablet computer 337. The linkage 504 allows the upper portion 535 to be separated from the base 420 and the couplings 540 allow the tablet computer 337 to be rotated in the stand. In the illustrated embodiment, the linkage 504 can include two inner arms 508 and two outer arms 510. Once the mobile computer 337 is rotated to the desired orientation, the linkage 504 can be collapsed to move the tablet computer 337 against the base 420 as shown in FIGS. 11 and 12.

Figure 13:
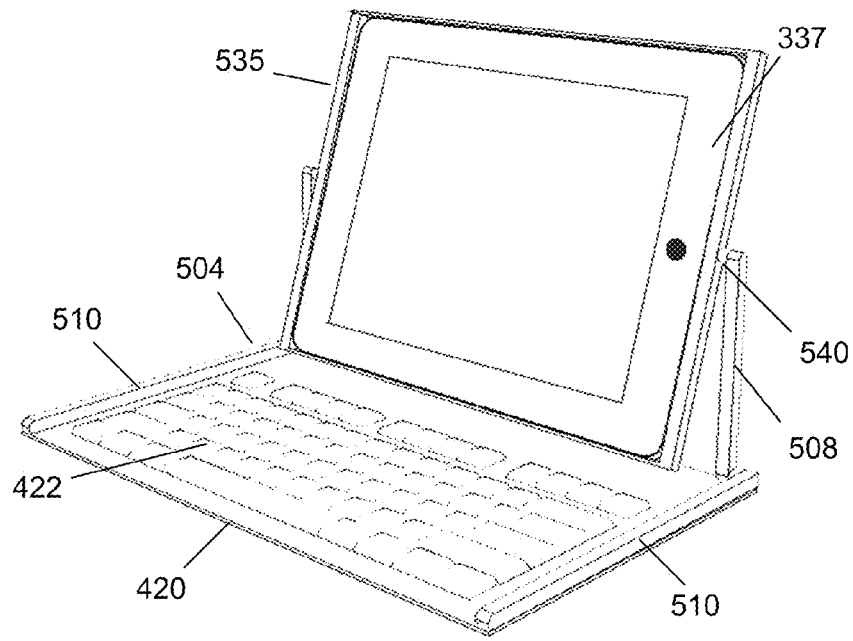
Figure 14:
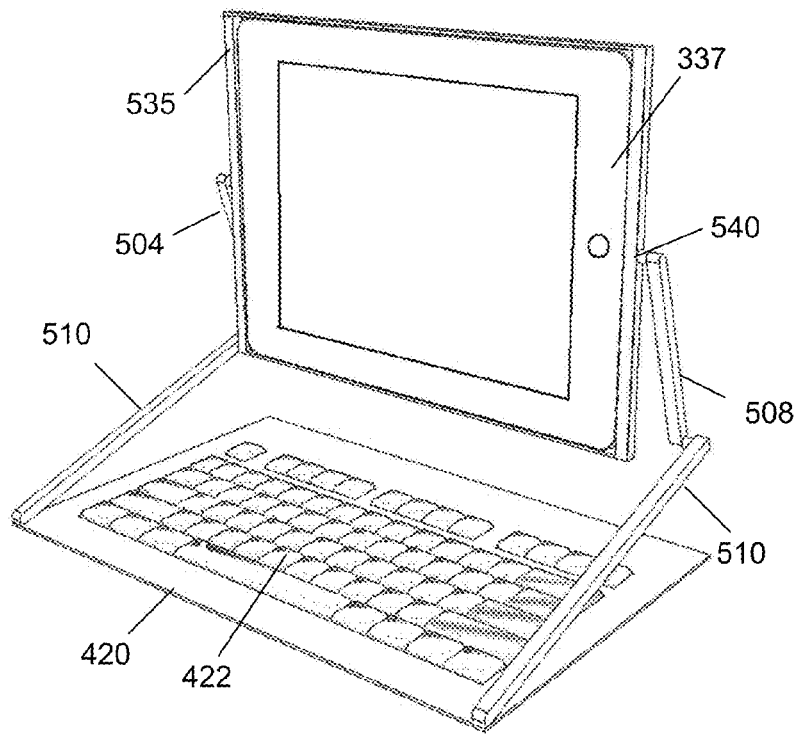

With reference to FIGS. 13 and 14, the stand has been adjusted to separate the tablet computer 337 from the base 420 to expose the integrated keyboard 422. In an embodiment, the linkage 504 may include two or more arms 510. The inner arms 508 may couple the upper portion 535 to the outer arms 510 with first ends of the inner arms attached to the couplings 540 and second ends of the inner arms 508 attached to first ends of the outer arms 510. The second ends of the outer arms 510 can be coupled to the base 420. The connections at the ends of the inner arms 508 and the outer arms 510 can be friction hinges, ratchet hinges, friction/locking couplings, or any other suitable coupling.

A user can rotate the arms 508, 510 to the desired positions and the friction forces in the hinges will hold the arms 508, 510 in the desired positions, supporting the tablet computer 337. Alternatively, user can rotate the arms 508, 510 to the desired positions and actuate locking mechanisms in the hinges will hold the arms 508, 510 in the desired positions. In an embodiment, the user may have to release the locking mechanisms to move the positions of the arms 508, 510. In other embodiments, other mechanisms such as torsion, gas, helical or other springs can be used to help hold some or all of the connections in the desired positions. For example, a support stand or other mechanism can be placed under the outer arms 410 to hold them in the desired elevated positions. Similar support stands can be used to hold the inner arms 308 in position. However, because the gravitational force on the tablet computer 337 may be aligned vertically, a high friction or locking mechanism may not be required for the ends of the inner arms.

As discussed, the tablet computer 337 may include magnets. In an embodiment, the upper portion of the stand may include corresponding magnets which can help hold the tablet computer 337 to the upper portion of the stand. In an embodiment, the lower edge of the upper portion of the stand can have a tab that extends over the display surface of the mobile computer and magnets attached to the tab or within the tab that correspond to the magnets in the tablet computer 337. The upper edge of the upper portion of the stand may also include magnets which correspond to the magnets in the tablet computer 337. By aligning the magnets of the mobile computer with the magnets of the upper portion of the stand, the tablet computer 337 can be securely attached to the upper portion of the stand.

Figure 15:
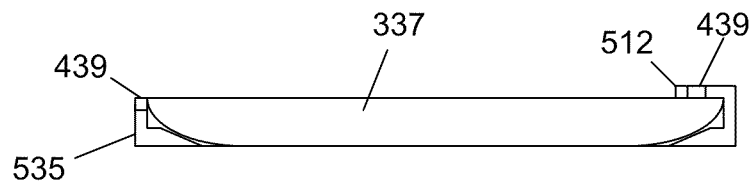
FIGS. 15-16 illustrate views of table computer in a portion of the stand.

With reference to FIG. 15, a cross section view of the tablet computer 337 and the upper portion 535 of the stand is illustrated. The upper portion 535 may include a tab 512 that extends over a portion of the right side of the tablet computer 337. The upper portion 535 may also include magnets that help to hold the tablet computer 337 in the upper portion. The magnets may be located on the upper portion 535 adjacent to the left edge of the tablet computer 337 and in the tab 512. The tablet computer 337 can be inserted into the upper portion by first placing the right edge under the tab 512 and then lowering the left side so that the tablet computer 337 is substantially aligned with the upper portion 535. The upper portion 535 may have an inner opening that is narrower than the perimeter of the tablet computer 337 so that the tablet computer 337 may not pass through the upper portion 535. In other embodiments, the upper portion 535 may have a solid surface that covers the back surface of the mobile computer 337.

Figure 16:
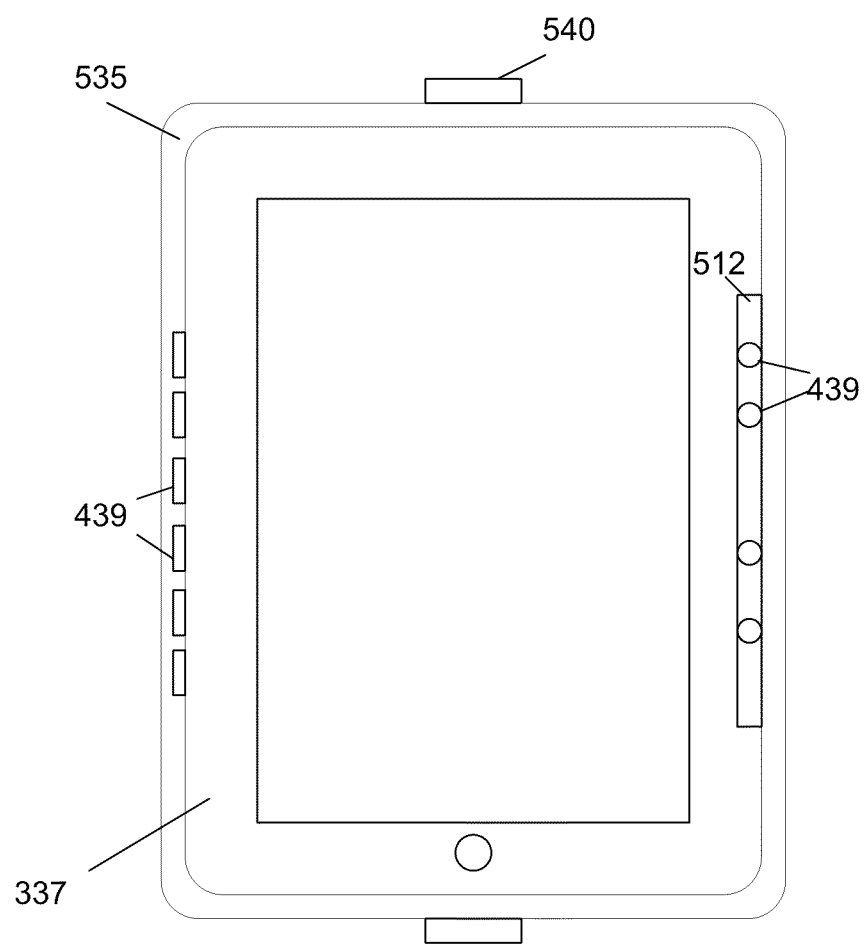

With reference to FIG. 16 a front of the tablet computer 337 is shown in the upper portion 535 of the stand. As discussed, the number of magnets 439 may match the number of magnets in the tablet computer 337 and the magnets 439 can be aligned with magnets within the tablet computer 337. In other embodiments, the number of magnets 439 on the upper portion 535 may not match the number of magnets on the tablet computer 337.

Figure 17:
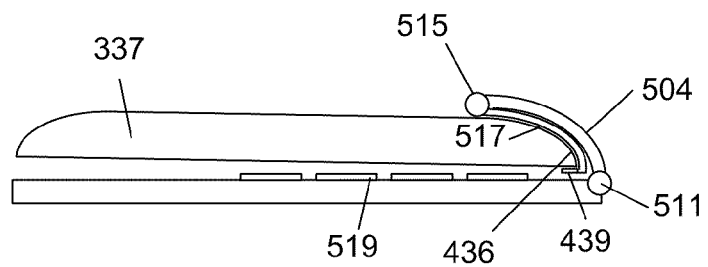
FIGS. 17-19 illustrate an embodiment of the stand in multiple positions.
Figure 18:
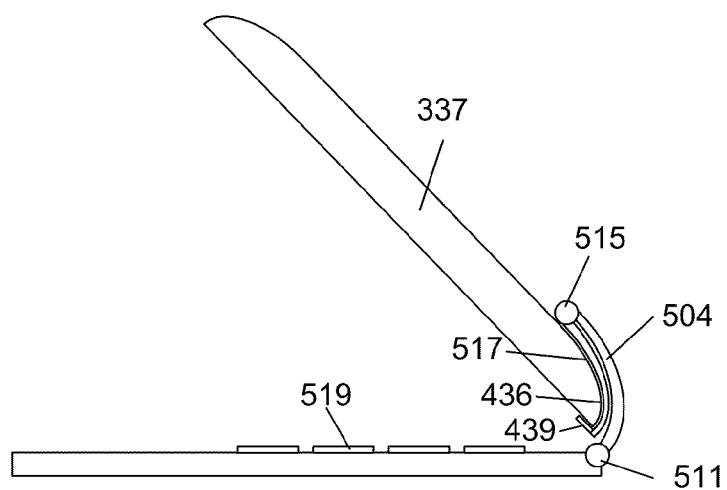
Figure 19:
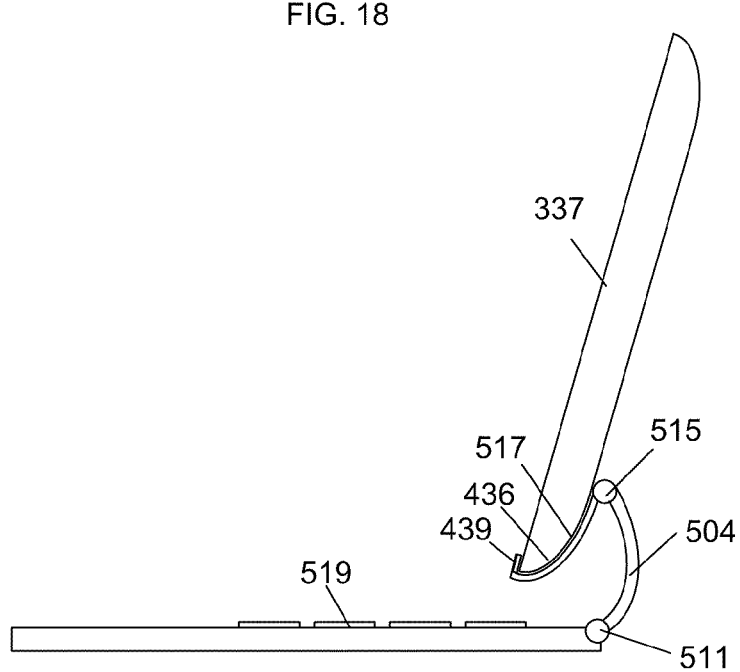

With reference to FIGS. 17-19, in another embodiment the stand can be coupled to a side of the tablet computer 337 by the attractive forces of the magnets 439 in an upper surface structure 517 to the magnets in the mobile computer 337. The upper surface structure 517 can have a groove structure 436 that has an inner surface shape that corresponds to the outer edge of the tablet computer 337. In FIG. 17, the display side of the tablet computer 337 can be stored adjacent to the integrated keyboard 519 on the base 420. When user wishes to use the tablet computer 337, the user can lift the tablet computer 337 which causes the linkage 504 to rotate about a hinge 511 the back edge of the base 420. With reference to FIG. 19, once the linkage 504 is in an upright position, the tablet computer 337 can be rotated about a coupling 515 at the top of the linkage 504 to the desired viewing position.

Figure 20:
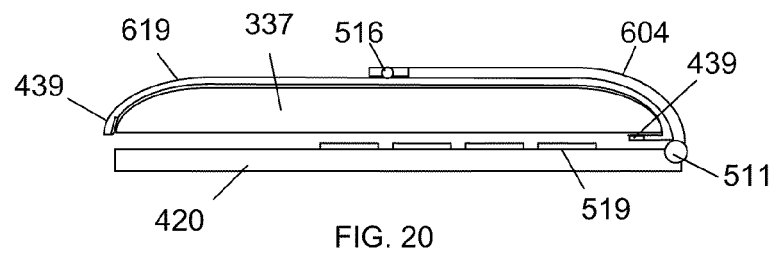
Figure 21:
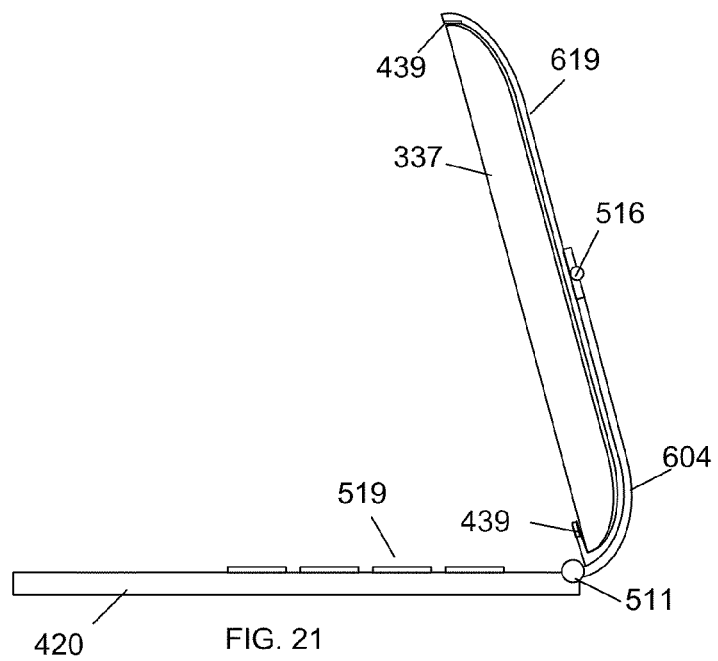
Figure 22:
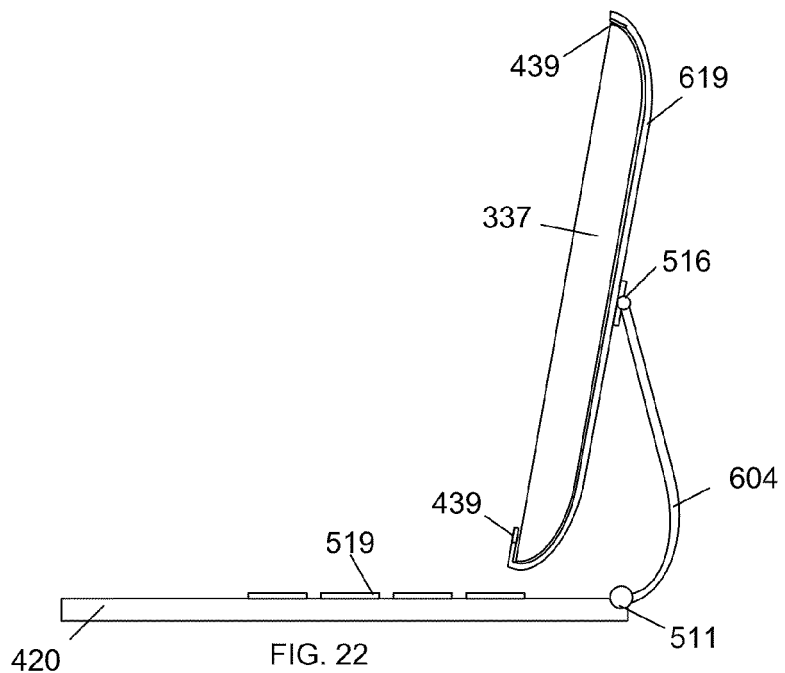

With reference to FIGS. 20-23, in yet another embodiment, the upper portion 604 of the stand can be coupled across the width of the tablet computer 337. Magnets 439 on opposite ends of the upper portion 619 can be coupled to corresponding magnets on the tablet computer 337. The upper portion 619 can be coupled to the linkage 604 by a coupling 516 that allows rotation in multiple axis of rotations. For example, the tablet computer 337 can rotate about a horizontal axis of rotation and the tablet 337 may also rotate between landscape and portrait viewing orientations. In FIG. 20, the display surface of the tablet computer 337 can be stored against the integrated keyboard 519 portion of the base 420. In FIG. 21, the tablet computer 337 can be rotated about the hinge 511 on the lower end of the linkage 604 at the back edge of the base 420. With reference to FIG. 22, the tablet computer 337 can be rotated to the desired viewing position about the coupling 604 at the top of the linkage 604. With reference to FIG. 23, the tablet computer 337 can continue to be rotated about the coupling 516 so that the back surface of the tablet computer 337 is adjacent to the keyboard portion 519 of the base 420. In this configuration, the tablet computer 337 can be positioned at a slight angle that can allow for typing on the display surface and a comfortable viewing angle.

With reference to FIG. 24, a rear view of the stand is illustrated against the back of the tablet computer 337. The coupling 516 may include a dual hinge that allows the upper portion 619 to rotate relative to the linkage 604 in multiple axis of rotations. For example, the upper portion 619 may rotate about a horizontal hinge to adjust the viewing angle and rotate about an axis that is substantially perpendicular to the plane of the tablet computer 337 to change the viewing orientation. The lower portion of the linkage 604 can be coupled to the back edge of the base 420.

Figure 25:
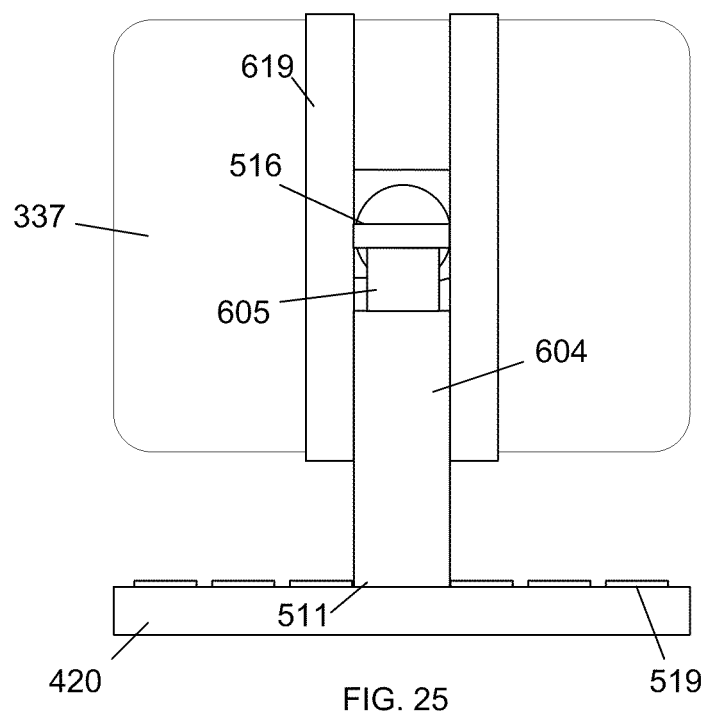
Figure 26:
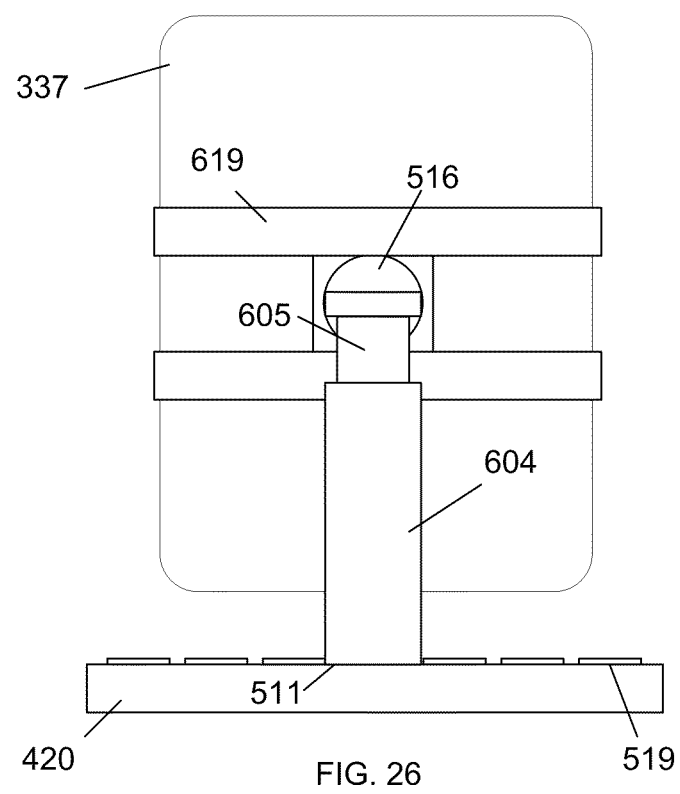

FIG. 25 illustrates a rear view of the stand is illustrated. The coupling 516 may allow the tablet computer 337 to be rotated between landscape and portrait viewing orientations. However, it may be necessary to extend the length of the linkage 604 with the linkage 604 to allow this type of rotation. In this embodiment, the linkage 604 is extended with a telescoping extension piece 605 to raise and hold the position of the tablet computer 337. In other embodiments, any other suitable type of mechanisms can be used to extend and hold the linkage 604 in an extended position. With reference to FIG. 26, the tablet computer 337 and upper portion 619 have been rotated to a portrait orientation. In the illustrated example, the coupling 516 may include a hinge that allows the upper portion 619 and tablet computer 337 to be rotated about a horizontal axis to adjust the viewing angle. The horizontal hinge can be coupled to a circular structure that allows the upper portion 619 and tablet computer 337 to rotate between portrait and landscape viewing orientations. In other embodiments, any other suitable type of coupling can be used to allow rotation about multiple axis of the upper portion 619 and tablet computer 337 about the linkage 604.

Figure 27:
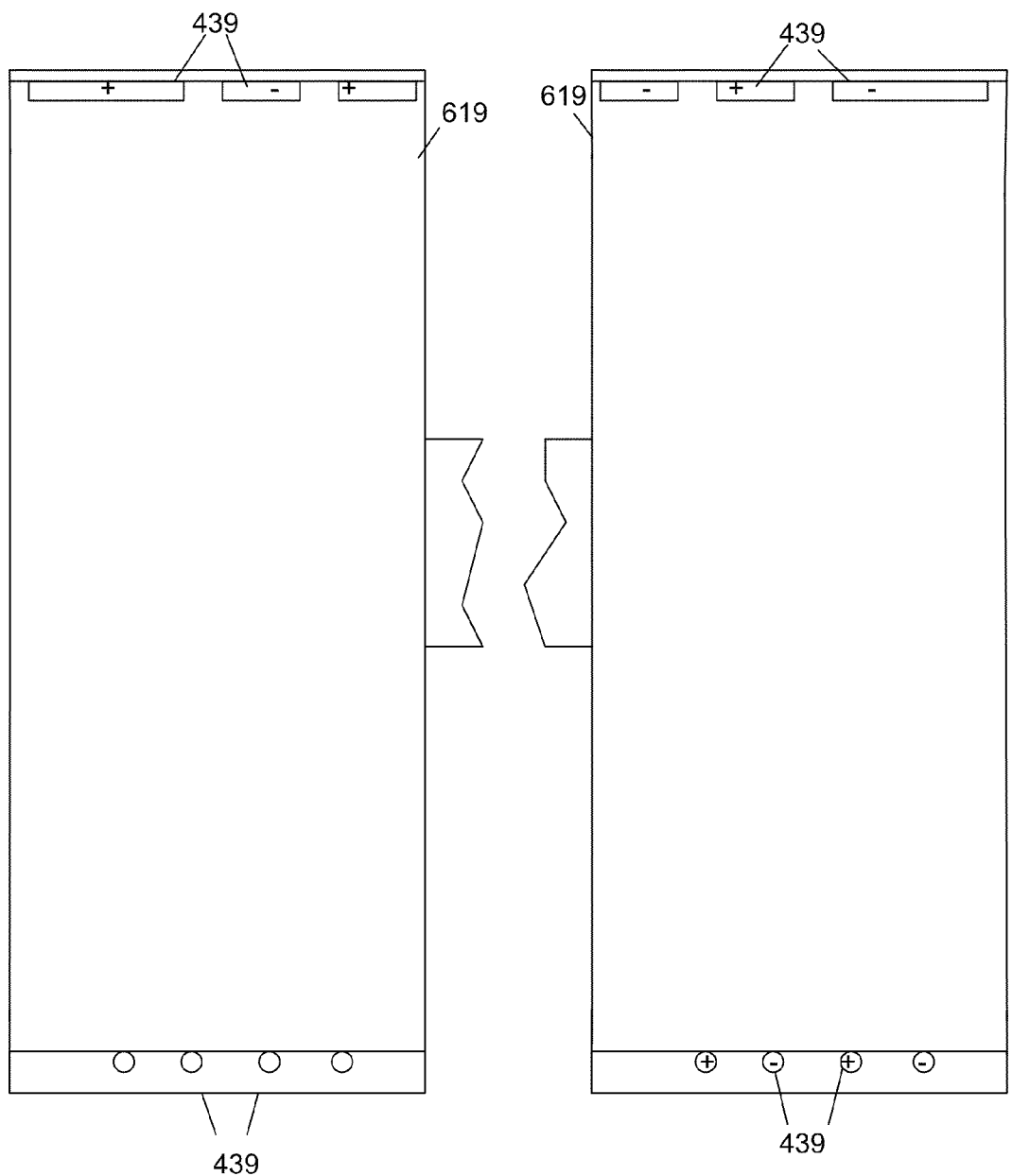
FIG. 27 illustrates details of an embodiment of the stand having permanent magnets. Like reference symbols in the various drawings indicate like elements.

FIG. 27 illustrates details of the magnets 439 in the upper portion 619. As discussed, the upper portion may include a plurality of magnets 439. The polarity of the magnets 439 can be either positive + or negative −. Magnets 439 that are of opposite polarities will attract each other. The magnets 439 can be configured with polarities opposite in polarity of the magnets in the tablet computer 337. Thus, the opposite polarity will tend couple the tablet computer 337 to the upper portion 619 of the stand. In the illustrated example, the magnets 439 in the stand have a specific size and polarity that can match one or more of the magnets in the tablet computer 337. In other embodiments, the size, shape and polarity of the magnets 439 can be any configuration that corresponds to magnets in the tablet computer 337.

A number of implementations have been described. Nevertheless, it will be understood that various modifications may be made without departing from the spirit and scope of the techniques, devices, and systems disclosed herein. Accordingly, other embodiments are within the scope of the following claims.

What is claimed is:

1. A device comprising:
   a base adapted to rest upon a surface and comprising a keyboard that is physically integrated with the base;
   a stand attached to the base and comprising:
     an upper portion adapted to support a display of a portable computer, and rotational couplings attached to the upper portion and adapted to attach to opposite sides of the display of the portable computer to secure the display of the portable computer physically to the upper portion of the stand;
     an adjustable linkage connected to the base on one end and connected to the upper portion of the stand on another end, the adjustable linkage adapted to position the upper portion of the stand such that the display of the portable computer is positioned in space at least in part directly above the base and of sufficient distance above the base to allow a user to position the user's hands on the integrated keyboard to cause input to be made on the integrated keyboard; and
   a connection mechanism associated with the integrated keyboard and adapted to provide data communication from the integrated keyboard to the display of the portable computer resting upon the upper portion of the stand.

2. The device of claim 1, wherein the adjustable linkage is adapted to collapse in a manner such that a back surface of the display of the portable computer is directly adjacent the base and a display surface of the portable computer is exposed.

3. The device of claim 1, wherein the adjustable linkage is adapted to collapse in a manner such that a display surface of the portable computer is directly adjacent the base and a back surface of the portable computer is exposed.

4. The device of claim 1, wherein the adjustable linkage is adapted to position the upper portion such that a forward end of the upper portion of the stand is forward of a plane extending vertically from a rear end of the integrated keyboard.

5. The device of claim 1, wherein the connection mechanism comprises a wireless transceiver electrically connected to the integrated keyboard and adapted to communicate with a portable computer resting on the upper surface of the stand to provide data communication from the integrated keyboard to the portable computer.

6. The device of claim 1, wherein the device further comprises a battery power source to provide a power source for the integrated keyboard.

7. The device of claim 1, wherein the device is adapted to be used with a tablet type portable computer.

8. The device of claim 1, wherein the device further comprises a groove adapted to engage an edge of the portable computer.

9. The device of claim 8, wherein the device further comprises a first permanent magnet attached to a first side of the attachment mechanism.

10. The device of claim 8, wherein the attachment mechanism extends across a surface of the portable computer and the attachment mechanism further comprises a second magnet coupled to a second side of the attachment mechanism that is opposite the first side of the attachment mechanism.

11. A device comprising:
- a base adapted to rest upon a surface and comprising a keyboard that is physically integrated with the base;
- a stand attached to the base and comprising:
  - an upper portion adapted to support a display of a portable computer rests;
  - rotational couplings attached to the upper portion of the stand;
  - a hinge connected to the base on one end; and
  - an adjustable linkage coupled to the hinge and the rotational couplings, the adjustable linkage adapted to position the display of the portable computer in a space at least in part directly above the base and of sufficient distance above the base to allow a user to position the user's hands on the integrated keyboard to cause input to be made on the integrated keyboard;
- a connection mechanism associated with the integrated keyboard and adapted to provide data communication from the integrated keyboard to the display of the portable computer.

12. The device of claim 11, wherein the hinge is adapted to collapse in a manner such that a back surface of the portable computer is directly adjacent the base and a display surface of the portable computer is exposed.

13. The device of claim 11, wherein the hinge is adapted to collapse in a manner such that a display surface of the portable computer is directly adjacent the base and a back surface of the portable computer is exposed.

14. The device of claim 11, wherein the device further comprises:
- a plurality of permanent magnets.

15. The device of claim 11, wherein the connection mechanism comprises a wireless transceiver electrically connected to the integrated keyboard and adapted to communicate with the display of the portable computer.

16. The device of claim 11, wherein the device further comprises a battery power source to provide a power source for the integrated keyboard.

17. The device of claim 11, wherein the device is adapted to be used with a tablet type portable computer.

18. A device comprising:
- a base adapted to rest upon a surface and comprising a keyboard that is physically integrated with the base;
- a stand attached to the base, the stand comprising:
  - rotational couplings attached to opposite sides of a display of a portable computer;
  - an adjustable linkage coupled to the rotational couplings, the adjustable linkage adapted to position the display of the portable computer is positioned in space at least in part directly above the base and of sufficient distance above the base to allow a user to position the user's hands on the integrated keyboard to cause input to be made on the integrated keyboard; and
- a connection mechanism associated with the integrated keyboard and adapted to provide data communication from the integrated keyboard to the display of the portable computer.

19. The device of claim 18, wherein the device further comprises a plurality of permanent magnets.

20. The device of claim 18, wherein the connection mechanism comprises a wireless transceiver electrically connected to the integrated keyboard and adapted to communicate with the display of the portable computer.

* * * * *